US012342301B2

(12) United States Patent
Leon Calvo et al.

(10) Patent No.: US 12,342,301 B2
(45) Date of Patent: Jun. 24, 2025

(54) PRIORITY MANAGEMENT FOR D2D COMMUNICATION DEVICES AS SYNCHRONIZATION SOURCE

(71) Applicant: Telefonaktiebolaget LM Ericsson (publ), Stockholm (SE)

(72) Inventors: Jose Angel Leon Calvo, Aachen (DE); Congchi Zhang, Shanghai (CN); Shehzad Ali Ashraf, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 326 days.

(21) Appl. No.: 17/778,545

(22) PCT Filed: Nov. 15, 2019

(86) PCT No.: PCT/EP2019/081517
§ 371 (c)(1),
(2) Date: May 20, 2022

(87) PCT Pub. No.: WO2021/093971
PCT Pub. Date: May 20, 2021

(65) Prior Publication Data
US 2023/0345394 A1 Oct. 26, 2023

(51) Int. Cl.
*H04W 56/00* (2009.01)
*H04W 92/18* (2009.01)
(52) U.S. Cl.
CPC ........ *H04W 56/0015* (2013.01); *H04W 92/18* (2013.01)
(58) Field of Classification Search
CPC ........................... H04W 56/0015; H04W 92/18
See application file for complete search history.

(56) References Cited

U.S. PATENT DOCUMENTS

| | | | | |
|---|---|---|---|---|
| 8,954,609 B1* | 2/2015 | Holleman | ............. | H04J 3/0667 709/227 |
| 9,379,856 B2 | 6/2016 | Khoryaev et al. | | |
| 9,736,874 B2* | 8/2017 | Sartori | ............. | H04W 4/70 |
| 2008/0291891 A1* | 11/2008 | Jerlhagen | ............. | H04W 8/04 370/350 |

(Continued)

FOREIGN PATENT DOCUMENTS

WO    2015065631 A1    5/2015

OTHER PUBLICATIONS

International Search Report and Written Opinion dated Oct. 15, 2020 for International Application No. PCT/EP2019/081517 filed Nov. 15, 2019, consisting of 22 pages.

(Continued)

*Primary Examiner* — Kan Yuen
(74) *Attorney, Agent, or Firm* — Weisberg I.P. Law, P.A.

(57) ABSTRACT

A D2D communication device sends a synchronization signal to enable synchronization of one or more other D2D communication devices. The D2D communication device provides the synchronization signal with an indication that the synchronization signal is derived from a D2D communication device configured as a synchronization master which, when not being synchronized to an external synchronization reference, has a higher priority to be used as a synchronization source than other D2D communication devices not synchronized to an external synchronization reference.

19 Claims, 10 Drawing Sheets

(56) References Cited

U.S. PATENT DOCUMENTS

| | | | |
|---|---|---|---|
| 2010/0203835 A1* | 8/2010 | Ryu | H04W 56/0015 455/41.2 |
| 2015/0036540 A1* | 2/2015 | Kasslin | H04W 48/16 370/254 |
| 2016/0037549 A1* | 2/2016 | Seo | H04W 76/14 370/329 |
| 2018/0152987 A1 | 5/2018 | Ro et al. | |
| 2019/0059094 A1* | 2/2019 | Kaur | H04W 76/14 |
| 2021/0119716 A1* | 4/2021 | Yang | H04W 56/001 |
| 2021/0243713 A1* | 8/2021 | Ellenbeck | H04W 56/002 |

OTHER PUBLICATIONS

Schlienz, J., and A. Roessler. "Device to device communication in lte whitepaper." Rohde & Schwarz: Munich, Germany (2015), consisting of 36-pages.

3GPP TR 38.885 V16.0.0; 3rd Generation Partnership Project; Technical Specification Group Radio Access Network; NR; Study on NR Vehicle-to-Everything (V2X) (Release 16); Mar. 2019, consisting of 4 pages.

* cited by examiner

PRIORITY MANAGEMENT FOR D2D COMMUNICATION DEVICES AS SYNCHRONIZATION SOURCE

CROSS-REFERENCE TO RELATED APPLICATION

This application is a Submission Under 35 U.S.C. § 371 for U.S. National Stage Patent Application of International Application Number: PCT/EP2019/081517, filed Nov. 15, 2019 entitled "PRIORITY MANAGEMENT FOR D2D COMMUNICATION DEVICES AS SYNCHRONIZATION SOURCE," the entirety of which is incorporated herein by reference.

TECHNICAL FIELD

The present invention relates to methods for controlling device-to-device (D2D) communication and to corresponding devices, systems, and computer programs.

BACKGROUND

Current wireless communication networks, e.g., based on the LTE (Long Term Evolution) or NR technology as specified by 3GPP ($3^{rd}$ Generation Partnership Project), also support D2D communication modes to enable direct communication between UEs (user equipments), sometimes also referred to as sidelink communication. Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communication is another term used to refer to this class of communication. Vehicle communications have the potential to increase traffic safety, reduce energy consumption and enable new services related to intelligent transportation systems.

Due to the nature of the basic road safety services, LTE V2X functionalities have been designed for broadcast transmissions, i.e., for transmissions where all receivers within a certain range of a transmitter are may receive a message from the transmitter, i.e., may be regarded as intended recipients. In fact, the transmitter may not be aware or otherwise be able to control the group of intended receivers. V2X functionalities for the NR technology are for example described in 3GPP TR 38.885 V16.0.0 (2019-03). In the NR technology, also more targeted V2X services are considered, by supporting also groupcast, multicast, or unicast transmissions, in which the intended receiver of a message consists of only a subset of the receivers within a certain range of the transmitter (groupcast) or of a single receiver (unicast). For example, in a platooning service for vehicles there may be certain messages that are only of interest for a member vehicle of the platoon, so that the member vehicles of the platoon can be efficiently targeted by a groupcast transmission. In another example, the see-through functionality, where a one vehicle provides video data from a front facing camera to a following vehicle, may involve V2X communication of only a pair of vehicles, for which unicast transmissions may be a preferred choice. Furthermore, NR sidelink communication supports D2D communication of UEs with and without network coverage, with varying degrees of interaction between the UEs and the network, including the possibility of standalone, network-less operation.

A further potential use case of D2D communication is NSPS (National Security and Public Safety). In traditional specific NSPS communication systems such as TETRA (Terrestrial Trunked Radio), data rates are in the order of a few kbits at most, which is regarded to be not sufficient to support future NSPS use case scenarios. Moreover, the NSPS use case requires enhanced coverage and high reliability of communication. Some scenarios of the NSPS use case also involve operation without support from infrastructure, e.g., NSPS communication in tunnels, inside certain buildings, or in certain emergency situations where the infrastructure is destroyed or non-operative. Even though in some of these situations, cellular coverage could be provided using mobile base stations, e.g., trucks with a portable base station, basing at least a part of NSPS communication on LTE or NR sidelink communication is considered to the implementation of sidelink communications can provide benefits concerning the achievable data rates, robustness, and reliability of operation without network coverage. In the case of NR sidelink communication, also NSPS group communication scenarios can be efficiently addressed, such as communication among a group of workers in a building or at an emergency site.

In D2D communication, synchronization of UEs may be used for establishing D2D communication or for enhancing performance of D2D communication. The synchronization typically involves providing synchronization information to a UE. For example, in a sidelink discovery procedure of the LTE technology, the synchronization information may include a Sidelink Synchronization Signal (SLSS), timing information, and/or some additional configuration parameters, e.g., a MasterinformationBlock-SL message or MasterinformationBlock-SL-V2X message. In the NR technology the synchronization information may include an Sidelink Synchronization Signal Block (S-SSB). In each case, the synchronization information is transmitted in a broadcast mode. The synchronization information transmitted by a UE may be derived from information or signals received from the network while the UE is within network coverage, received from another UE acting as synchronization reference, or received from a Global Navigation Satellite System (GNSS). A UE acting as a synchronization reference may also be referred to as SyncRef UE. Synchronization of UEs is beneficial both for sidelink discovery and communication among the UEs. This applies both to in coverage scenarios and out-of-coverage scenarios.

In the known synchronization procedures sidelink communication, it is known to consider synchronization priorities to handle cases where multiple synchronization references are available to a UE. For example, a synchronization signal derived from a network base station (in the LTE technology referred to a eNB and in the NR technology referred to as eNB), may be preferred over synchronization to synchronization signal derived from the internal clock of a SyncRef UE. However, the known synchronization procedures may provide unsatisfactory results in out-of-coverage scenarios where only synchronization signals from other UEs are available, since these synchronization signals will be handled with the same priority. This may result in unpredictable synchronization behavior or a selection of synchronization signals which is not adequate from a performance perspective. Still further, in an out-of-coverage scenario the known procedures may result in significant delays until a UE finds an adequate synchronization reference.

Accordingly, there is a need for techniques which allow for efficiently managing synchronization references for D2D communication in out-of-coverage scenarios.

SUMMARY

According to an embodiment, a method of controlling device-to-device communication is provided. According to the method, a D2D communication device sends a synchronization signal to enable synchronization of one or more other D2D communication devices. The D2D communication device provides the synchronization signal with an indication that the synchronization signal is derived from a D2D communication device configured as a synchronization master which, when not being synchronized to an external synchronization reference, has a higher priority to be used as a synchronization source than other D2D communication devices not synchronized to an external synchronization reference.

According to a further embodiment, a method of controlling device-to-device communication is provided. According to the method, configuration information is provided to a D2D communication device. The configuration information indicates whether the D2D communication device is configured as a synchronization master which, when not being synchronized to an external synchronization reference, has a higher priority to be used as a synchronization source than other D2D communication devices not synchronized to an external synchronization reference.

According to a further embodiment, a D2D communication device is provided. The D2D communication device is configured to send a synchronization signal to enable synchronization of one or more other D2D communication devices. Further, the D2D communication device is configured to provide the synchronization signal with an indication that the synchronization signal is derived from a D2D communication device configured as a synchronization master which, when not being synchronized to an external synchronization reference, has a higher priority to be used as a synchronization source than other D2D communication devices not synchronized to an external synchronization reference.

According to a further embodiment, a D2D communication device is provided. The D2D communication device comprises at least one processor and a memory. The memory contains instructions executable by said at least one processor, whereby the D2D communication device is operative to send a synchronization signal to enable synchronization of one or more other D2D communication devices. Further, the memory contains instructions executable by said at least one processor, whereby the D2D communication device is operative to provide the synchronization signal with an indication that the synchronization signal is derived from a D2D communication device configured as a synchronization master which, when not being synchronized to an external synchronization reference, has a higher priority to be used as a synchronization source than other D2D communication devices not synchronized to an external synchronization reference.

According to a further embodiment, a device for configuration of a D2D communication device is provided. The device is configured to provide configuration information to a D2D communication device. The configuration information indicates whether the D2D communication device is configured as a synchronization master which, when not being synchronized to an external synchronization reference, has a higher priority to be used as a synchronization source than other D2D communication devices not synchronized to an external synchronization reference.

According to a further embodiment, a device for configuration of a D2D communication device is provided. The device comprises at least one processor and a memory. The memory contains instructions executable by said at least one processor, whereby the device is operative to provide configuration information to a D2D communication device. The configuration information indicates whether the D2D communication device is configured as a synchronization master which, when not being synchronized to an external synchronization reference, has a higher priority to be used as a synchronization source than other D2D communication devices not synchronized to an external synchronization reference.

According to a further embodiment of the invention, a computer program or computer program product is provided, e.g., in the form of a non-transitory storage medium, which comprises program code to be executed by at least one processor of a D2D communication device. Execution of the program code causes the D2D communication device to send a synchronization signal to enable synchronization of one or more other D2D communication devices. Further, execution of the program code causes the D2D communication device to provide the synchronization signal with an indication that the synchronization signal is derived from a D2D communication device configured as a synchronization master which, when not being synchronized to an external synchronization reference, has a higher priority to be used as a synchronization source than other D2D communication devices not synchronized to an external synchronization reference.

According to a further embodiment of the invention, a computer program or computer program product is provided, e.g., in the form of a non-transitory storage medium, which comprises program code to be executed by at least one processor of a device for configuration of a D2D communication device. Execution of the program code causes the device to provide configuration information to a D2D communication device. The configuration information indicates whether the D2D communication device is configured as a synchronization master which, when not being synchronized to an external synchronization reference, has a higher priority to be used as a synchronization source than other D2D communication devices not synchronized to an external synchronization reference.

Details of such embodiments and further embodiments will be apparent from the following detailed description of embodiments.

DETAILED DESCRIPTION OF EMBODIMENTS

Figure 1:
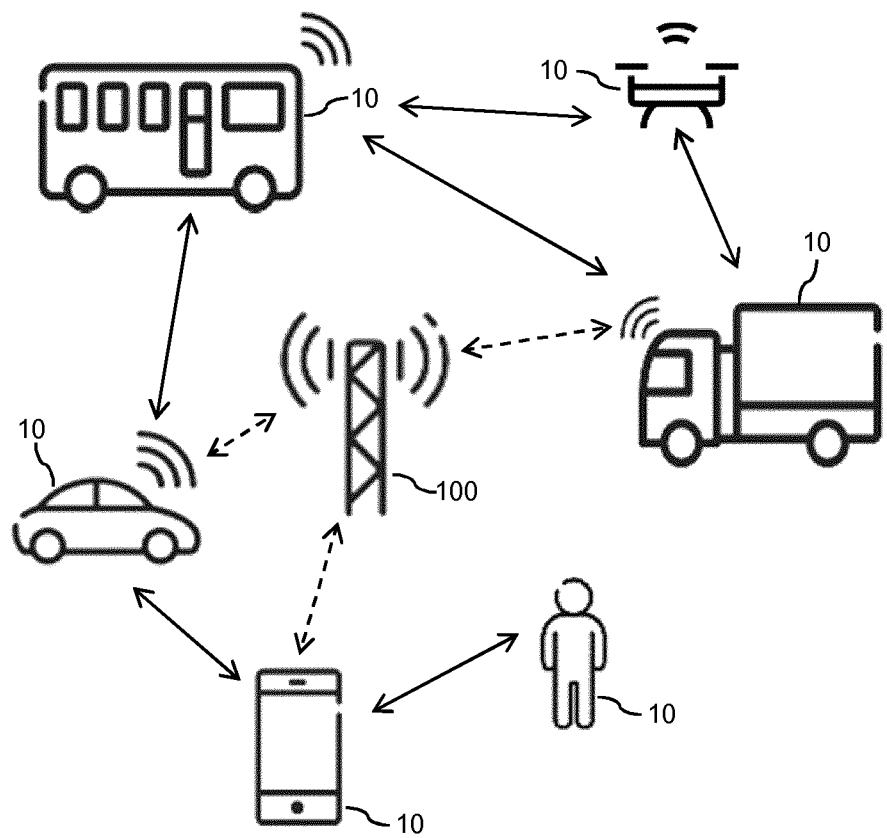
FIG. 1 schematically illustrates an exemplary V2X scenario in which D2D communication may be controlled according to an embodiment of the invention.

In the following, concepts in accordance with exemplary embodiments of the invention will be explained in more detail and with reference to the accompanying drawings. The illustrated embodiments relate to controlling of D2D communication by D2D communication devices. These D2D communication devices may include various types of WDs. As used herein, the term "wireless device" (WD) refers to a device capable, configured, arranged, and/or operable to communicate wirelessly with network nodes and/or other WDs. Unless otherwise noted, the term WD may be used interchangeably herein with UE (User Equipment). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. In some examples, in an Internet of Things (IoT) scenario, a WD may also represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The illustrated concepts particularly concern WDs that support D2D communication, for example by implementing a 3GPP standard for sidelink communication, Vehicle-to-Vehicle (V2V), Vehicle-to-Infrastructure (V2I), Vehicle-to-Everything (V2X). The D2D communication may for example be based on the LTE radio technology or the NR radio technology as specified by 3GPP. However, it is noted that the illustrated concepts could also be applied to other radio technologies, e.g., a WLAN (Wireless Local Area Network) technology.

In the illustrated concepts, a role of a synchronization master is defined for D2D communication devices. The synchronization master is a D2D communication device which, when not being synchronized to an external synchronization reference, has a higher priority to be used as a synchronization source than other D2D communication devices not synchronized to an external synchronization reference. Synchronization signals transmitted by the D2D communication devices include an indication whether they are derived from a synchronization master. In an out-of-coverage scenario, where D2D communication devices can only synchronize to other D2D communication devices or to their internal clock, the synchronization master can thus be defined as a preferred synchronization source. In this way, it can be achieved that synchronization of D2D communication devices converges to a well-defined state. Further, the synchronization master may transmit its synchronization signal more frequently than other D2D communication devices, which are not configured as synchronization master. Further, D2D communication devices which derive a synchronization signal from a synchronization master, can transmit this synchronization signal more frequently than other a synchronization signal not derived from a synchronization master. In this way, preferred synchronization information can be quickly distributed in a group of D2D communication devices.

In the illustrated concepts, the role of a synchronization master can be preconfigured in the D2D communication device, e.g., by manufacturer or network operator settings. Further, a node of a wireless communication network could configure one or more D2D communication devices to act as synchronization master. This configuration may be accomplished while the respective D2D communication device is within coverage of the wireless communication network. A D2D communication device can use the synchronization master as a synchronization source, either directly, by synchronizing to a synchronization signal from the synchronization master, or indirectly by synchronizing to a synchronization signal derived from the synchronization master by a multi-hop process involving one or more intermediate D2D communication devices. The synchronization source is the first D2D communication device in a chain of D2D communication device propagating the synchronization.

FIG. 1 illustrates an exemplary scenario involving V2X communications. In particular, FIG. 1 shows various UEs 10, which may engage in V2X communication or other D2D communication, illustrated by solid arrows. Further, FIG. 1 shows an access node 100 of a wireless communication network, e.g., an eNB of the LTE technology or a gNB of the NR technology, or an access point of a WLAN (Wireless Local Area Network). At least some of the UEs 10 may also be capable of communicating by using DL radio transmissions and/or UL radio transmissions, illustrated by broken arrows.

The UEs illustrated in FIG. 1 comprise vehicles, a drone, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 1 are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, or helicopter, in a spacecraft, in a train or car of a train, in a ship, in a motorcycles, in a bicycle, in a mobility scooter, or in any other kind of mobility or transportation device.

The involved communication entities, i.e., the UEs 10, may be equipped with multiple transmit and receive antennas in order to enable V2X communications using beamformed transmissions. Accordingly, the V2X communication from a certain UE 10 may utilize multiple beams corresponding to different spatial directions. A beamforming mechanism of the UEs 10 may for example be based on an adaptive phased array beamforming technique or on a switched beam beamforming technique.

Figure 2:
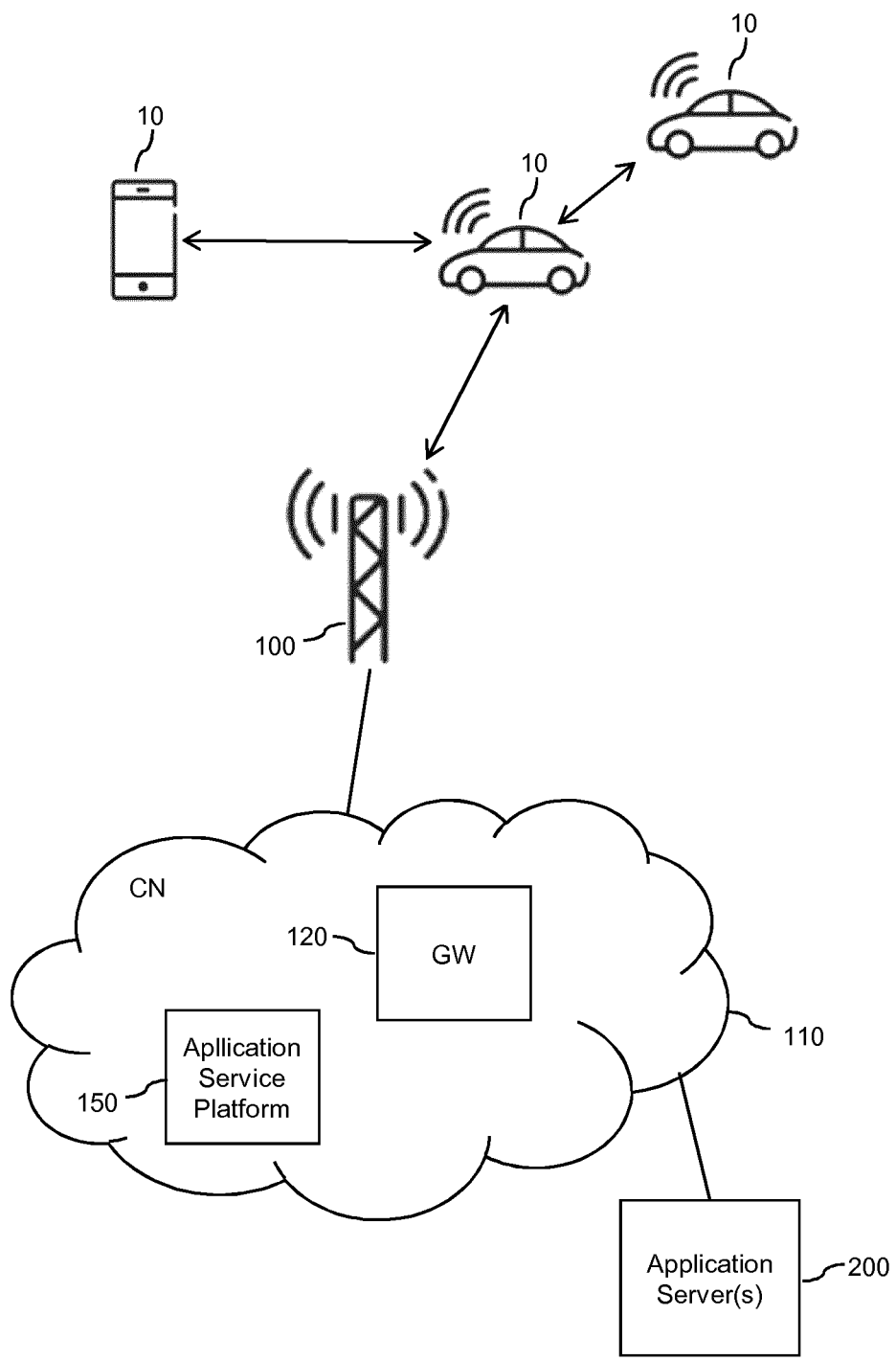
FIG. 2 schematically illustrates an exemplary scenario according to an embodiment of the invention, in which D2D communication may be controlled according to an embodiment of the invention.

FIG. 2 illustrates an exemplary D2D communication scenario. In particular, FIG. 2 shows multiple UEs 10, which are connected to each other by radio links (illustrated by double-headed arrows). Further, one of the UEs 10 is connected by a radio link to an access node 100 of a wireless communication network, e.g., to an eNB of the LTE technology, or a gNB of the NR technology. The access node 100 is part of a RAN (Radio Access Network) of the wireless communication network, which typically also includes further access nodes to provide a desired coverage of the wireless communication network. Further, FIG. 2 shows a core network 110 of the wireless communication network. The CN 110 may provide connectivity of the UEs 10 to other data networks, e.g., through a GW 120 provided in the CN 110. Further, the CN 110 may also include various nodes for controlling operation of the UEs 10.

The radio links may be used for D2D communication between the UEs 10. Further, the radio link to the wireless communication network may be used for controlling or otherwise assisting the D2D communication. Further, the D2D communication and/or data communication with the wireless communication network may be used for providing various kinds of services to the UEs 10, e.g., a voice service, a multimedia service, a data service, an intelligent transportation system (ITS) or similar vehicular management or coordination service, and/or an NSPS service. Such services may be based on applications which are executed on the UE 10 and/or on a device linked to the UE 10. Further, FIG. 2 illustrates an application service platform 150 in a core network (CN) 120 of the wireless communication network. Further, FIG. 2 illustrates one or more application servers 200 provided outside the wireless communication network. The application(s) executed on the UE 10 and/or on one or more other devices linked to the UE 10 may use the radio links with one or more other UEs 10, the application service platform 150, and/or the application server(s) 200, thereby enabling the corresponding service(s) on the UE 10. In some scenarios, the services utilized by the UEs 10 may thus be hosted on the network side, e.g., on the application service platform 150 or on the application server(s) 200.

However, some of the services may also network-independent so that they can be utilized without requiring an active data connection to the wireless communication network. This may for example apply to certain V2X or NSPS services. Such services may however still be assisted from the network side while the UE 10 is in coverage of the wireless communication network.

In the example of FIG. 2, the UEs 10 are assumed to be a mobile phone and vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit, like for example illustrated in FIG. 1.

Figure 3:
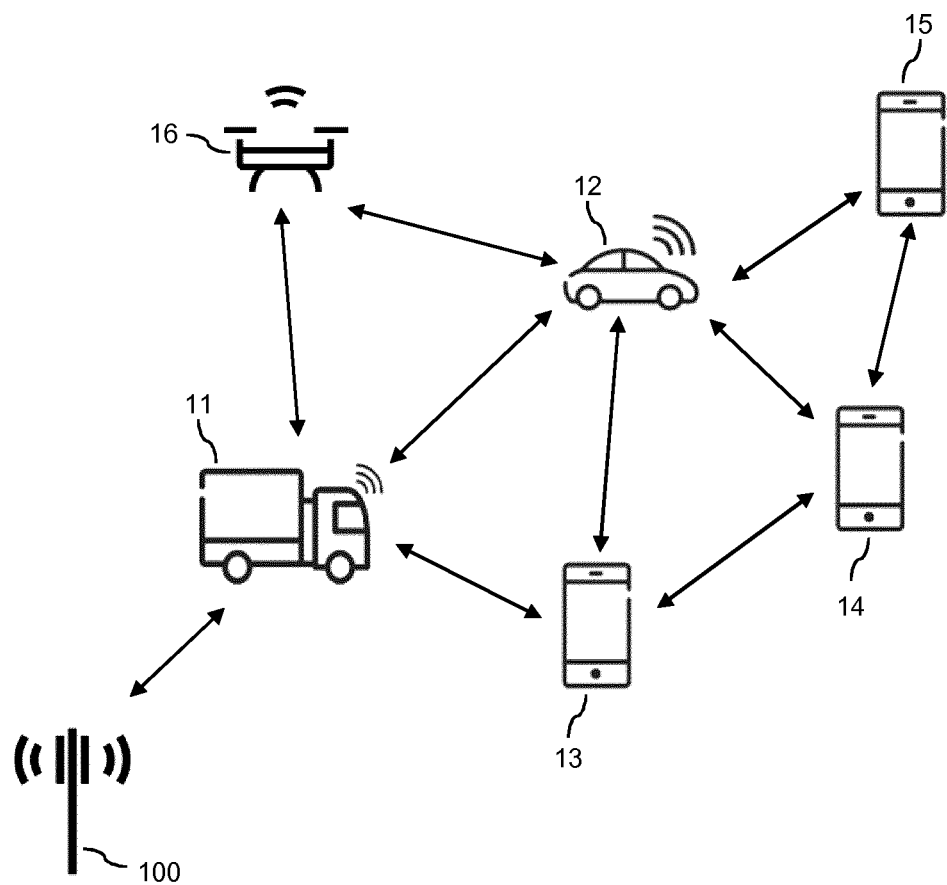
FIG. 3 schematically illustrates an exemplary NSPS communication scenario in which D2D communication may be controlled according to an embodiment of the invention.

FIG. 3 schematically illustrates an NSPS communication scenario. In particular, FIG. 3 shows multiple UEs 11, 12, 13, 14, 15, which may exchange NSPS messages associated with one or more NSPS services using D2D communication, e.g., based on the LTE sidelink communication or NR sidelink communication. As further illustrated, the NSPS services may be assisted from the network, by exchanging NSPS messages via access node 100. The NSPS services may for example include group communication of rescue vehicles, rescue personnel or other equipment or personnel of public safety related organizations. Such communication may also involve relaying of communication by the UEs 11, 12, 13, 14, 15.

It is noted that in the scenarios of FIGS. 1, 2, and 3, the UEs 10, 11, 12, 13, 14, 15 may utilize different types of synchronization sources and that these different types of synchronization sources may have different priorities. A first type of synchronization source may be an access node of the wireless communication network, e.g., an eNB or gNB, such as the above-mentioned access node 100. A second type of synchronization source may be another UE 10 which is directly synchronized to an access node of the wireless communication network, e.g., an eNB or gNB, such as the above-mentioned access node 100. Here, directly synchronized means that the synchronization is based on a synchronization signal which the other UE 10 receives from the access node. A third type of synchronization source may be another UE 10 which is indirectly synchronized to an access node of the wireless communication network, e.g., an eNB or gNB, such as the above-mentioned access node 100. Here, indirectly synchronized means that the synchronization is based on a synchronization signal which the other UE 10 receives from a still further UE 10 that is directly or even indirectly synchronized to the access node. A fourth type of synchronization source may be a GNSS. A fifth type of synchronization source may be another UE 10 which is directly synchronized to a GNSS. Here, directly synchronized means that the synchronization is based on a synchronization signal which the other UE 10 receives from the GNSS. A sixth type of synchronization source may be another UE 10 which is indirectly synchronized to a GNSS. Here, indirectly synchronized means that the synchronization is based on a synchronization signal which the other UE 10 receives from a still further UE 10 that is directly or even indirectly synchronized to the GNSS. A seventh type of synchronization source may be any UE 10, which is not synchronized to any external synchronization source (a SyncRef UE). The latter case may include using the respective UE's 10, 11, 12, 13, 14, 15 own internal clock as synchronization source.

For the above types of synchronization sources, the first type may be assigned a first priority P0, the second type may be assigned a second priority P1, the third type may be assigned a third priority P2, the fourth type may be assigned a fourth priority P3, the fifth type may be assigned a fifth priority P4, the sixth type may be assigned a sixth priority P5, and the seventh type may be assigned a seventh priority P6, with the first priority being higher than the second priority, the second priority being higher than the third priority, the third priority being higher than the fourth priority, the fourth priority being higher than the fifth priority, the fifth priority being higher than the sixth priority, and the sixth priority being higher than the seventh priority i.e., P0>P1>P2>P3>P4>P5>P6. It is noted that in some scenarios only a subset of these types of synchronization sources could be used. For example, in a scenario without network coverage the first type, second type and third type could be omitted. Still further, other types of synchronization sources could be considered as well. As can be seen, the types of synchronization sources and associated priorities may correspond to those as described in 3GPP TR 38.885 V16.0.0 (2019 March).

Figure 4:
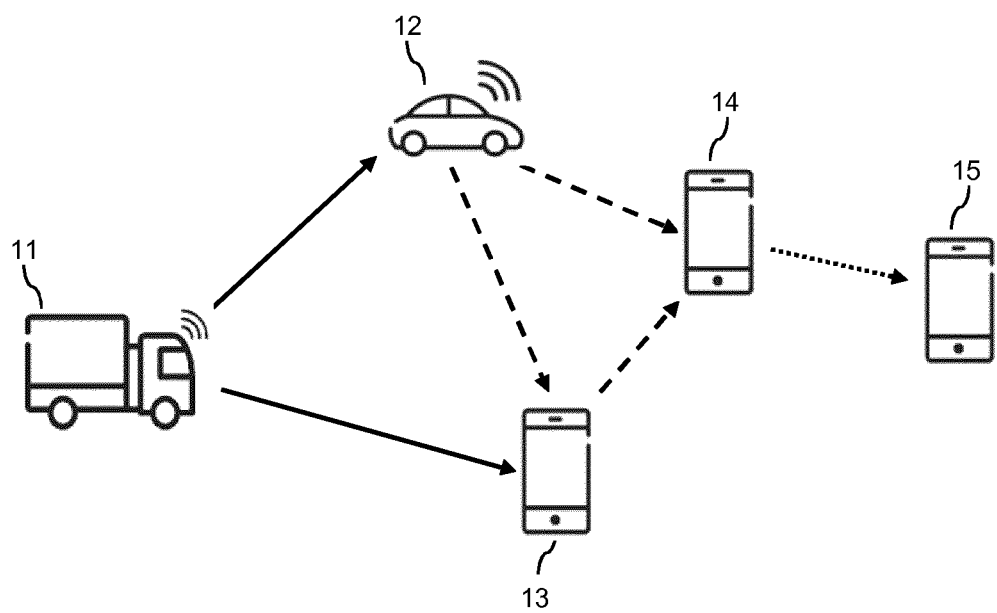
FIG. 4 schematically illustrates an exemplary scenario involving distribution of synchronization information according to an embodiment of the invention.

FIG. 4 illustrates a further exemplary scenario, which is similar to that of FIG. 3. However, in the scenario of FIG. 4, all UEs 11, 12, 13, 14, 15 are assumed to be in an out-of-coverage state. This may for example be due to the UE 11 moving out of coverage of the access node 100 or to a failure of the access node 100. In particular it is assumed that for none of the UEs 11, 12, 13, 14, 15 synchronization to an eNB or a gNB or to a GNSS is possible, because the UEs 11, 12, 13, 14, 15 at least on currently utilized frequency resources there is no coverage of an eNB, gNB or GNSS. In the scenario of FIG. 4, the UE 11 is assumed to be configured as a synchronization master. The UEs 12, 13, 14, 15 are assumed to be not configured as a synchronization master. In the following the UEs 12, 13, 14, 15 will therefore also be referred to as normal UEs.

As the synchronization master, the UE 11 derives a synchronization signal from its internal clock. As illustrated by solid arrows, the UE 11 broadcasts the synchronization signal to enable synchronization of other UEs within range of the UE 11. In the illustrated example, the synchronization signal transmitted by the UE 11 is received by the UEs 12, 13.

The synchronization signal transmitted by the UE 11 includes an indication that the synchronization signal is derived from a synchronization master, in the following also referred to as "SM indication". The indication may for example be provided in the form of an indicator bit or flag, where a value of "1" may indicate that the synchronization signal is derived from a synchronization master, while a value of "0" may indicate that the synchronization signal is derived from a normal UE. Alternatively, the SM indication could also be provided in terms of a synchronization priority. For example, the above-mentioned priority order of synchronization source types could be supplemented by a synchronization source type corresponding to a UE configured as synchronization master. This type of synchronization source could then be assigned an additional priority PSM. In the above-mentioned priority order this additional priority level could then be arranged below the priority of the synchronization source type corresponding to another UE 10 which is indirectly synchronized to a GNSS, and the synchronization source type corresponding to a UE 10, which is not synchronized to any external synchronization source (and not acting as a synchronization master). Accordingly, the priority order could be redefined as: P0>P1>P2>P3>P4>P5>PSM>P6.

The SM indication may for example be included in the MasterinformationBlock-SL message or MasterinformationBlock-SL-V2X message of the LTE technology or in the S-SSB of the NR technology.

The UEs which are not configured as a synchronization master may forward the synchronization from a synchronization master, i.e., derive a synchronization signal directly or indirectly from a synchronization signal from a UE acting as a synchronization master and broadcast this synchronization signal to enable synchronization of still further UEs. In the scenario of FIG. 4. the UEs 12, 13 each receive synchronization signal from the UE 11, acting as the synchronization master, and derive a synchronization signal from the received synchronization signal for broadcasting to other UEs, as illustrated by dashed arrows. The synchronization signals from the UEs 12, 13 are also provided with the SM indication, thus enabling receiving UEs to identify that the synchronization signal is derived from a synchronization master.

In the example of FIG. 4, the synchronization signals from the UEs 12, 13 are received by the UE 14. The UE 14 operates in a similar manner and derives a synchronization signal from the received synchronization signal, and broadcasts the derived synchronization signal, as indicated by a dotted arrow. The synchronization signal from the UE 14 is also provided with the SM indication, thus enabling receiving UEs to identify that the synchronization signal is derived from a synchronization master. In the example of FIG. 4, the synchronization signal from the UE 14 is received by the UE 15. While not illustrated in FIG. 4, of course also the UE 15 may utilize the received synchronization signal to derive a synchronization signal to be broadcast to other UEs.

As can be seen, synchronization information originating from the UE 11 acting as the synchronization master is thus distributed in a multi-hop fashion. In some scenarios, only a UE which is configured as synchronization master may be allowed to transmit a synchronization signal derived from its internal clock, which may help to avoid synchronization conflicts and reduce excessive signalling.

Further, in the event that a higher priority synchronization signal, e.g., derived from an eNB, gNB, or GNSS, should become available at any of the UEs 11, 12, 13, 14, 15, this UE may then proceed by rather broadcasting a synchronization signal derived from this synchronization source, which can then be further distributed in a similar manner as the synchronization originating from the synchronization master.

In some scenarios, multiple UEs could be configured as a synchronization master. In such cases, the UE configured as a synchronization signal could first search for synchronization signals from other synchronization masters. In response to detecting a synchronization signal from another synchronization master, the UE may then derive a synchronization signal from the detected synchronization signal, rather than using its internal clock, and broadcast this derived synchronization signals. In this way, a UE which is already actively transmitting synchronization signals as a synchronization master (by deriving a synchronization signal from its internal clock and including the indication in the synchronization signal) is given a higher priority than a UE which is configured as a synchronization master, but has not yet started broadcasting a synchronization signal derived from its internal clock. This may help to avoid conflicts among multiple configured synchronization masters.

In some scenarios, a UE may also receive synchronization signals including the SM indication from different other UEs, e.g., like the UE 14 which in the example of FIG. 4 receives a first synchronization signal with the SM indication from the UE 12 and a second synchronization signal with the SM indication from the UE 13. In this case, the UE may apply various additional criteria for deciding which synchronization signal should be further utilized. For example, the UE may select the synchronization signal having the highest signal strength, e.g., in terms of RSRP (Reference Signal Received Power). In addition or as an alternative, the UE could also consider a number of hops to the synchronization source, i.e., to the UE 11 acting as the synchronization master. For this purpose, the synchronization signals may also include an indication of the number of hops to the synchronization source. In the example of FIG. 4, the synchronization signal from the UE 11 could indicate a number of hops $n_h=0$, the synchronization signal from the UEs 12, 13 could indicate a number of hops $n_h=1$, and the synchronization signal from the UE 14 could indicate a number of hops $n_h=2$. When receiving multiple synchronization signals with the SM indication, the UE may decide to utilize the synchronization signal indicating the lowest number of hops and derive the synchronization signal to be broadcast from this received synchronization signal. Accordingly, more directly received synchronization information may be preferred. This may help to further accelerate distribution of the synchronization information from the synchronization master.

The role of the synchronization master may also be considered in the timing of transmitting the broadcast signals. This will be further explained with reference to FIGS. 5A and 5B, which illustrate different variants of controlling timing of transmitting the synchronization signals in the scenario of FIG. 4. In each case, it is assumed that the synchronization signals are transmitted according to repetitive schedule. Similar to FIG. 4, the synchronization signals from the UE 11, i.e., the synchronization signals of the first hop, are illustrated by solid arrows, the synchronization signals from the UEs 12, 13, i.e., the synchronization signals of the second hop, are illustrated by dashed arrows, and the synchronization signals from the UE 14, i.e., the synchronization signals of the third hop, are illustrated by dotted arrows.

Figure 5A:
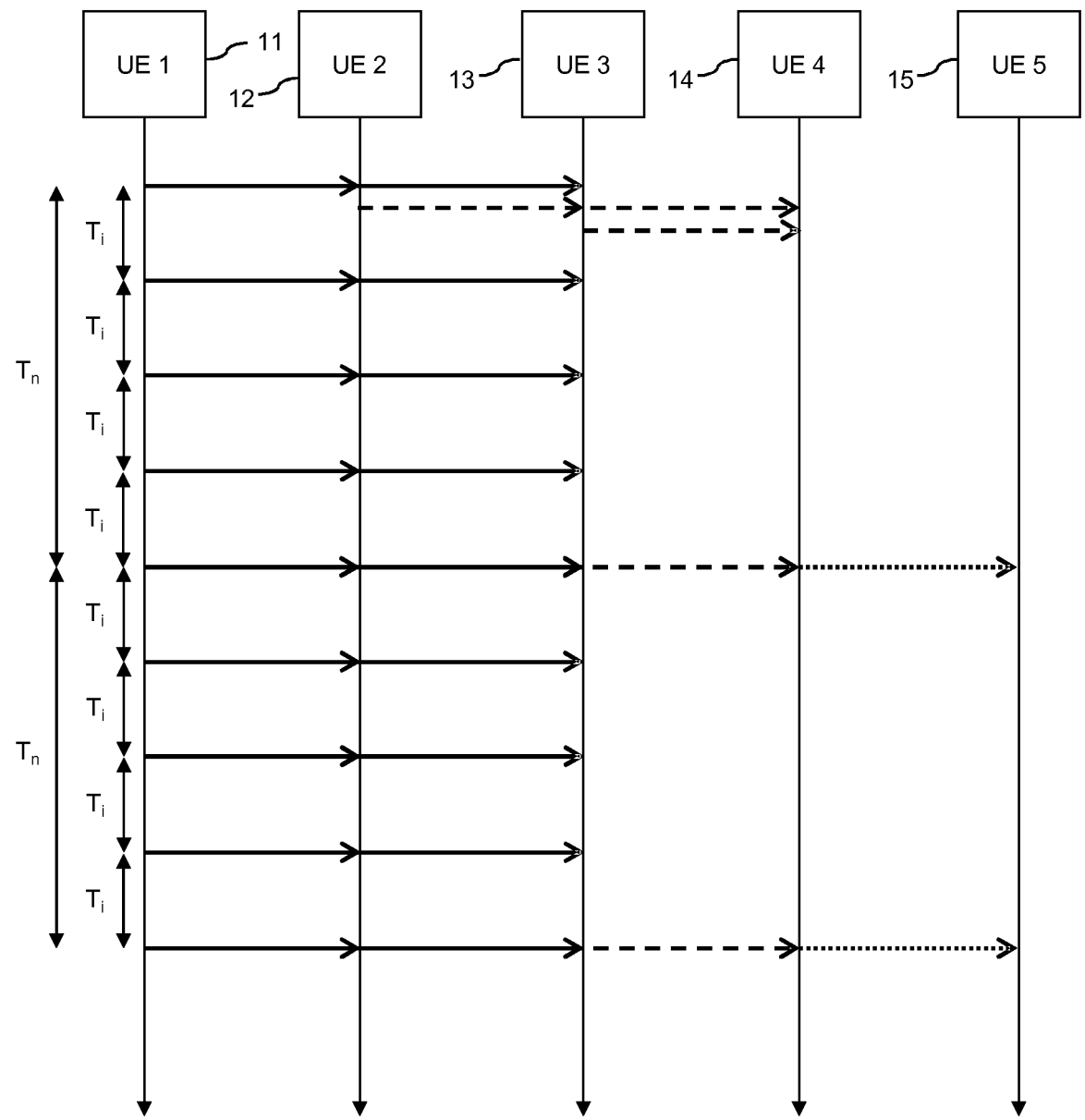
FIG. 5A shows an example of processes according to an embodiment of the invention.

In the variant of FIG. 5A, it is assumed that two different repetition rates can be applied for the transmission of the synchronization signal, a normal repetition rate, corresponding to a time interval $T_n$ between two successive occasions for transmission of the synchronization signal, and an increased repetition rate, corresponding to a time interval $T_i$ between two successive occasions for transmission of the synchronization signal. The increased repetition rate may be an integer multiple of the normal repetition rate. For example, the normal repetition rate could correspond to a value of $T_n=160$ ms, and the increased repetition rate could correspond to a value of $T_i=40$ ms.

In the example, of FIG. 5A the increased repetition rate is applied by the UE 11 acting as the synchronization master. The other UEs, i.e., the UEs 12, 13, 14, 15 apply the normal repetition rate. In this way, quick refreshing of the synchronization information from the synchronization master may be achieved, while at the same time avoiding excessive signalling load due to the forwarding of the synchronization information. In other examples, the increased repetition rate could also be applied by some of the normal UEs 12, 13, 14, 15. For example, depending on the number or hops indicated by the received synchronization signal, each UE 12, 13, 14, 15 could decide whether to apply the increased repetition rate or the normal repetition rate. If the number of hops is below a threshold, the UE 12, 13, 14, 15 could apply the increased repetition rate and otherwise apply the normal repetition rate. For example, the increased repetition rate could be applied only by the receiving UEs of the first hop, in the illustrated example the UEs 12, 13.

As further illustrated, fora normal UE 12, 13, 14, 15 forwarding the synchronization information from the UE 11 acting as the synchronization master, the timing of transmitting the synchronization signal may differ between initially forwarding the synchronization information from another UE and subsequent occasions of forwarding the synchronization information from this UE. When initially sending the synchronization signal forwarding the synchronization information, the normal UE 12, 13, 14, 15 may send the synchronization signal already before the next occasion defined by the repetitive schedule, e.g., in a next available time slot of the utilized radio technology. This early forwarding may be applied depending on the number or hops indicated by the received synchronization signal. For example, depending on the number or hops indicated by the received synchronization signal, each UE 12, 13, 14, 15 could decide whether to apply the early forwarding or to wait until the next occasion defined by the repetitive schedule. If the number of hops is below a threshold, the UE 12, 13, 14, 15 could apply the early forwarding and otherwise wait until the next occasion defined by the repetitive schedule. In the example of FIG. 5A, the early forwarding is applied at least by the UEs 12 and 13, i.e., by the receiving UEs of the first. In other examples, the early forwarding could also be applied by the receiving UEs of the second hop, i.e., also by the UE 14. The early forwarding may help to more quickly distribute the synchronization from the synchronization master. Limiting the early forwarding to an initial forwarding of synchronization information from another UE may help to more quickly distribute the synchronization information. In other examples, the early forwarding could however also be applied each time when forwarding synchronization information from a synchronization master.

For performing the early forwarding, the normal UE 12, 13, 14, 15 may utilize reserved radio resources, e.g., a reserved time slot, which are assigned to be used only for D2D synchronization signals and excluded from utilization by other D2D transmissions by the UEs 11, 12, 13, 14, 15. In this way, it can be avoided that the synchronization signal transmitted outside the repetitive schedule conflicts with other transmissions, e.g., a D2D transmission conveying data. In some scenarios, the reserved radio resources may be allocated to a particular UE 11, 12, 13, 14, 15, so that conflicts due to concurrent early forwarding by multiple UEs 12, 13, 14, 15 can be avoided. In other scenarios, the reserved radio resources may be available to multiple UEs 11, 12, 13, 14, 15, and the UE 12, 13, 14, 15, which performs the early forwarding, may sense availability of the radio resources before transmitting the synchronization signal. In some scenarios, conflicts of the synchronization signal transmitted outside the repetitive schedule with other transmissions can also be avoided by the UE 12, 13, 14, 15, which performs the early forwarding, sensing availability of the radio resources before transmitting the synchronization signal, without using any reservation of the radio resources.

The above-mentioned sensing procedure may involve that the UE 12, 13, 14, 15 receives and decodes sidelink control information (SCI) transmitted by one or more other UEs 11, 12, 13, 14, 15. From this SCI the UE 12, 13, 14, 15 can determine the radio resources intended to be used by D2D transmissions of other UEs 11, 12, 13, 14, 15 and thus efficiently determine that other radio resources, which are not intended to be used by D2D transmissions of other UEs 11, 12, 13, 14, 15, are potentially available to be used in the early forwarding. In addition or as an alternative, the sensing procedure could also be based on various kinds of LBT (Listen Before Talk) mechanisms, which involve monitoring the considered radio resources for transmission activity of other devices, e.g., in terms of energy level, and determining that the radio resources where transmission activity is below a threshold, are available to be used in the early forwarding.

In some situations, the utilization of the increased repetition rate by some of the UEs 11, 12, 13, 14, 15 may result in that one or more of the normal UEs 12, 13, 14, 15, which apply the normal repetition rate, receive multiple synchronization signals derived from the UE 11 acting as the synchronization master, before the next occasion for transmitting a synchronization signal as defined by the repetitive schedule based on the normal repetition rate. A similar situation may also occur due to the utilization of the early forwarding by some of the UEs 12, 13, 14, 15, when one or more of the normal UEs 12, 13, 14, 15, which do not apply the early forwarding, receive multiple synchronization signals derived from the UE 11 acting as the synchronization master, before the next occasion for transmitting a synchronization signal as defined by the repetitive schedule for the respective UE 12, 13, 14, 15. These multiple synchronization signals may also be received from different UEs. In the scenario of FIG. 5A, an example of such situation occurs for the UE 14, which first receives the synchronization signal from the UE 12 and then the synchronization signal from the UE 13. Before deciding which synchronization should be utilized as synchronization reference of the UE 14 and for deriving the synchronization to be broadcast by the UE 14, the UE 14 may collect received synchronization signals until the next occasion for transmitting a synchronization signal as defined by its repetitive schedule. In this way, it can be avoided that the UE 14 performs excessive changes of the synchronization reference within the time interval between two successive occasions for transmission of the synchronization signal. As mentioned above, the decision which synchronization should be utilized can be based on signal strengths of the received synchronization signals and/or on a number of hops to the synchronization source, i.e., to the UE 11 acting as the synchronization master.

Figure 5B:
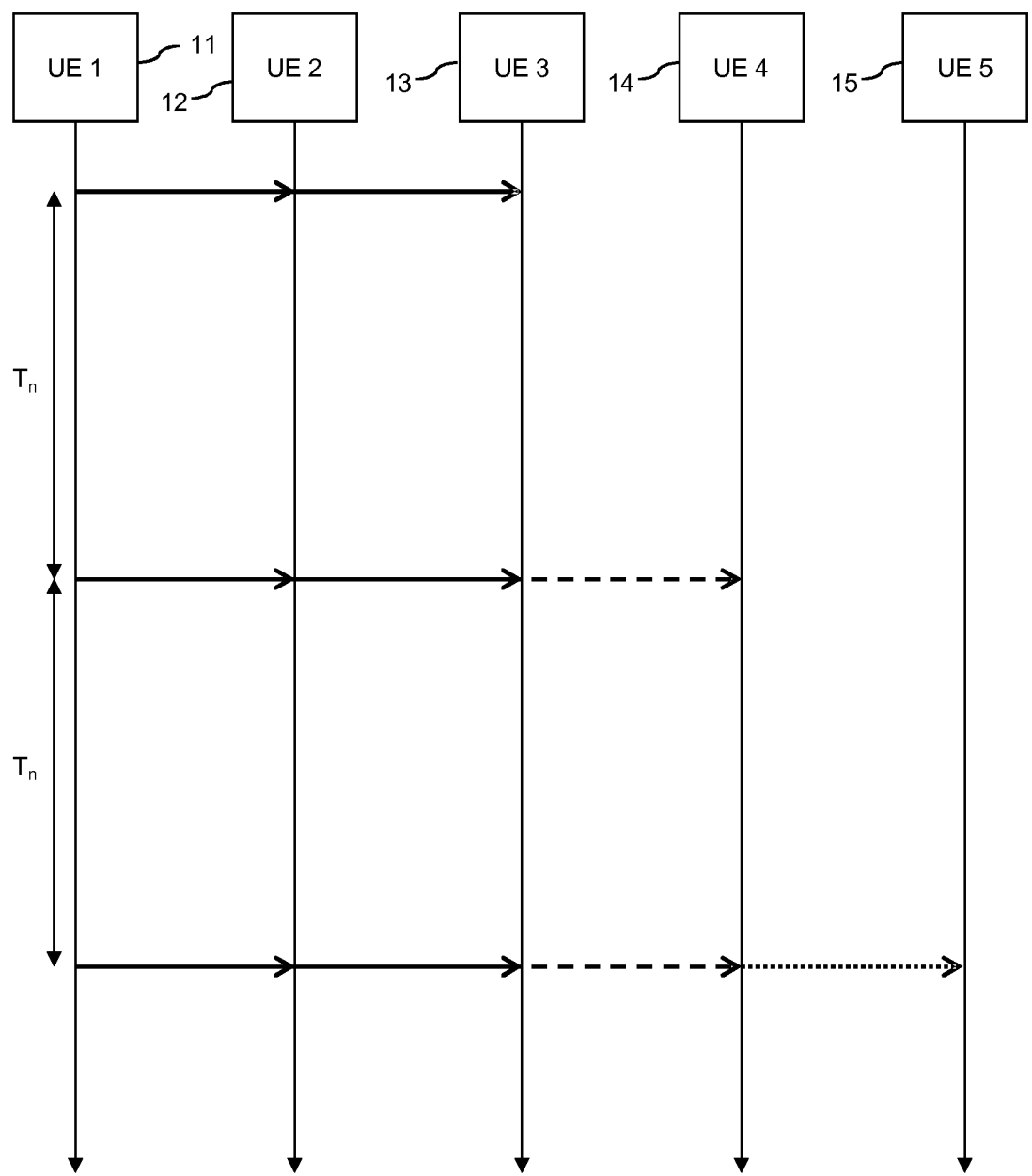
FIG. 5B shows processes according to a comparative example according to an embodiment of the invention.

The variant of FIG. 5B shows a more simple timing as a comparative example. In particular, the variant of FIG. 5B does not involve utilization of the increased repetition rate and also does not involve the early forwarding. Accordingly, the UE 11, 12, 13, 14, 15, send their synchronization signals only at the occasions defined by the repetitive schedule based on the normal repetition rate, and the normal UEs 12, 13, 14, 15 need to wait until the next occasion for transmission of a synchronization signal as defined by this repetitive schedule before synchronization information from the synchronization master can be forwarded to other UEs. As can be seen from a comparison of FIGS. 5A and 5B, utilization of the increased repetition rate and/or of the early forwarding in the variant of FIG. 5A allows for more quickly distributing the synchronization information from the synchronization master.

Figure 6:
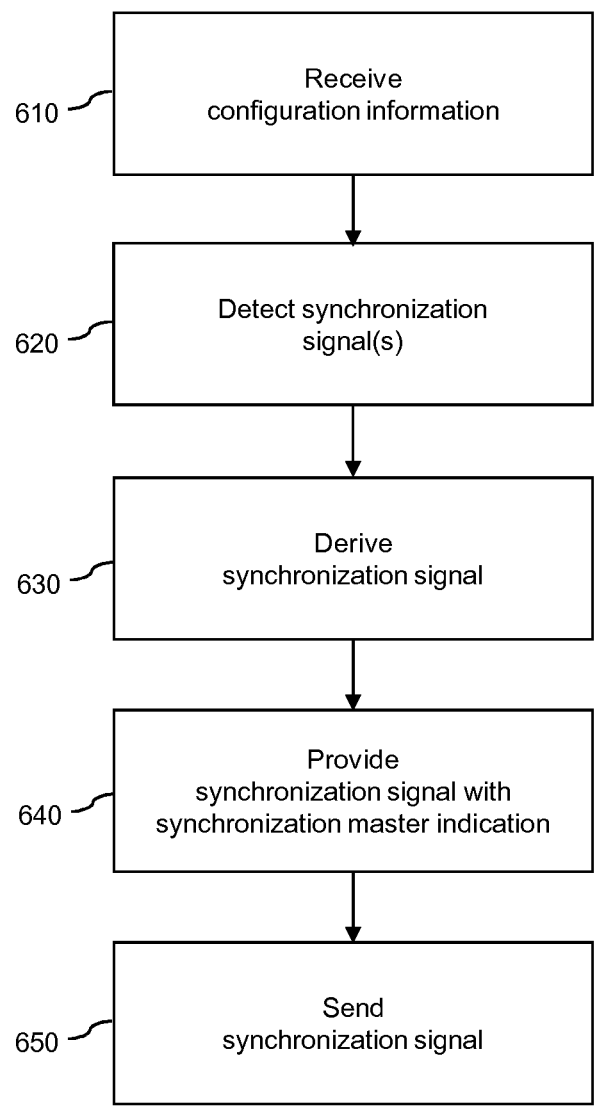
FIG. 6 shows a flowchart for schematically illustrating a method performed by a D2D communication device operating according to an embodiment of the invention.

FIG. 6 shows a flowchart for illustrating a method, which may be utilized for implementing the illustrated concepts. The method of FIG. 6 may be used for implementing the illustrated concepts in a D2D communication device, e.g., corresponding to any of the above-mentioned UEs 10, 11, 12, 13, 14, 15. In some scenarios, the D2D device may be a vehicle or vehicle-mounted device, but other types of WD, e.g., as mentioned above, could be used as well.

If a processor-based implementation of the D2D communication device is used, at least some of the steps of the method of FIG. 6 may be performed and/or controlled by one or more processors of the D2D communication device. Such D2D communication device may also include a memory storing program code for implementing at least some of the below described functionalities or steps of the method of FIG. 6.

At step 610, the D2D communication device may receive configuration information. The configuration information may indicate whether the D2D communication device is configured as a synchronization master. A synchronization master is a D2D communication device which, when not being synchronized to an external synchronization reference, has a higher priority to be used as a synchronization source than other D2D communication devices not synchronized to an external synchronization reference. In some scenarios, the D2D communication device may receive the configuration information from a node of a wireless communication network, e.g., while the D2D communication device is in coverage of the wireless communication network. However it is noted that other ways of providing the configuration information could be used as well, e.g., pre-configuration by manufacturer settings, operator settings, or manual settings.

At step 620, the D2D communication device may detect synchronization signal(s) from one or more other D2D communication devices. The detected synchronization signal(s) may include an indication whether the synchronization signal is derived from a D2D communication device configured as a synchronization master, e.g., like the above-mentioned SM indication. Further, the detected synchronization signal(s) may include an indication of a number of hops involved in deriving the detected synchronization signal from the synchronization source.

At step 630, the D2D communication device derives a synchronization signal. The D2D communication device may decide between deriving the synchronization signal from one of the synchronization signal(s) detected at step 620 and deriving the synchronization signal from its internal clock. This decision may depend on whether the D2D communication device is configured as a synchronization master and/or on the synchronization signal(s) detected at step 620.

In response to being configured as a synchronization master and not being synchronized to an external synchronization reference, the D2D communication device may derive the synchronization signal from an internal clock of the D2D communication device.

In some scenarios, step 630 may further involve considering synchronization signals detected at step 620. In particular, in response to none of the detected synchronization signals including an indication that the synchronization signal is derived from a D2D communication device configured as a synchronization master, the D2D communication device may derive the synchronization signal from the internal clock of the D2D communication device.

In some scenarios, the detected synchronization signal(s) of step 620 may include a synchronization signal with an indication that the synchronization signal is derived from a D2D communication device configured as a synchronization master. In this case, the D2D communication device may derive the synchronization signal from this detected synchronization signal. Deriving the synchronization signal from the detected synchronization signal may be accomplished even if the D2D communication device is configured as a synchronization master.

In some scenarios, if at step 620 the D2D communication device detected two or more synchronization signals with an indication that the synchronization signal is derived from a D2D communication device configured as a synchronization master, the D2D communication device may select one of the two or more synchronization signals and derive the synchronization signal from the selected synchronization signal. This selection may be based on a number of hops involved in deriving the detected synchronization signal from the synchronization source. As mentioned above, the number of hops may be indicated by the detected synchronization signals. Alternatively or in addition, the selection may be based on signal strengths of the two or more synchronization signals, the D2D communication device selecting one of the two or more synchronization signals.

At step 640, the D2D communication device provides the synchronization signal with an indication whether the synchronization signal is derived from a D2D communication configured as a synchronization master. The indication may for example correspond to the above-mentioned SM indication.

In some scenarios, if the D2D communication device is configured as a synchronization master, step 640 may involve that the D2D communication device provides the indication in response to, at step 630, deriving the synchronization signal from its internal clock. In other cases, step 640 may involve that the D2D communication device provides the indication in response to, at step 630, deriving the synchronization signal from the detected synchronization signal with the indication.

At step 650, the D2D communication device sends the synchronization signal with the indication provided at step 640, to enable synchronization of one or more other D2D communication devices. In some scenarios, the D2D communication device may broadcast the synchronization signal. However, other transmission modes could be used as well, e.g., multicast and/or beamformed transmission modes.

In some scenarios, the D2D communication device may send the synchronization signal at a first repetition rate which is different from a second repetition rate applied by one or more other D2D communication devices for sending a synchronization signal. As for example explained in connection with FIG. 5A, the second repetition rate may be a normal repetition rate, while the second repetition rate is an increased repetition rate which is higher than the normal repetition rate. The first repetition rate may be an integer multiple of the second repetition rate. In alternative scenarios, the first repetition rate could be lower than the second repetition rate.

In some scenarios, step 650 may involve that the D2D communication device sends the synchronization signal at synchronization occasions defined by a repetition rate, e.g., the above-mentioned first repletion rate or the second repetition rate. In such cases, if at step 630 the D2D communication device derived the synchronization signal from the detected synchronization signal with the indication, step 650 may involve that in response to initially detecting the synchronization signal with the indication, the D2D communication device sends the synchronization signal already before a next one of the synchronization occasions, e.g., like explained for the early forwarding of FIG. 5A.

In some scenarios, the D2D communication device may send the synchronization signal in a reserved radio resource before the next synchronization occasion. In addition or as an alternative, the D2D communication device may perform a sensing procedure to detect a radio resource which is available before the next synchronization occasion and send the synchronization signal in the detected available radio resource. The sensing procedure may involve detecting SCI transmitted by one or more other D2D communication devices and determining the radio resource based on the detected sidelink control information.

In some scenarios, the D2D communication device may perform the sending of the synchronization signal before the next synchronization occasion in response to a number of hops, involved in deriving the detected synchronization signal from the synchronization source, being below a threshold. The threshold may for example be one or two. As mentioned above, the number of hops may be indicated by the detected synchronization signal(s).

In some scenarios, the synchronization signal sent at step 650 may further indicate a number of hops involved in deriving the synchronization signal from the synchronization source.

It is noted that steps 610, 620, 630, 640, and 650 may be performed without requiring support from a wireless communication network or other external infrastructure, e.g., while the D2D communication device is outside coverage of any wireless communication network, so that access nodes of a wireless communication network or a GNSS are not available as synchronization sources.

Figure 7:
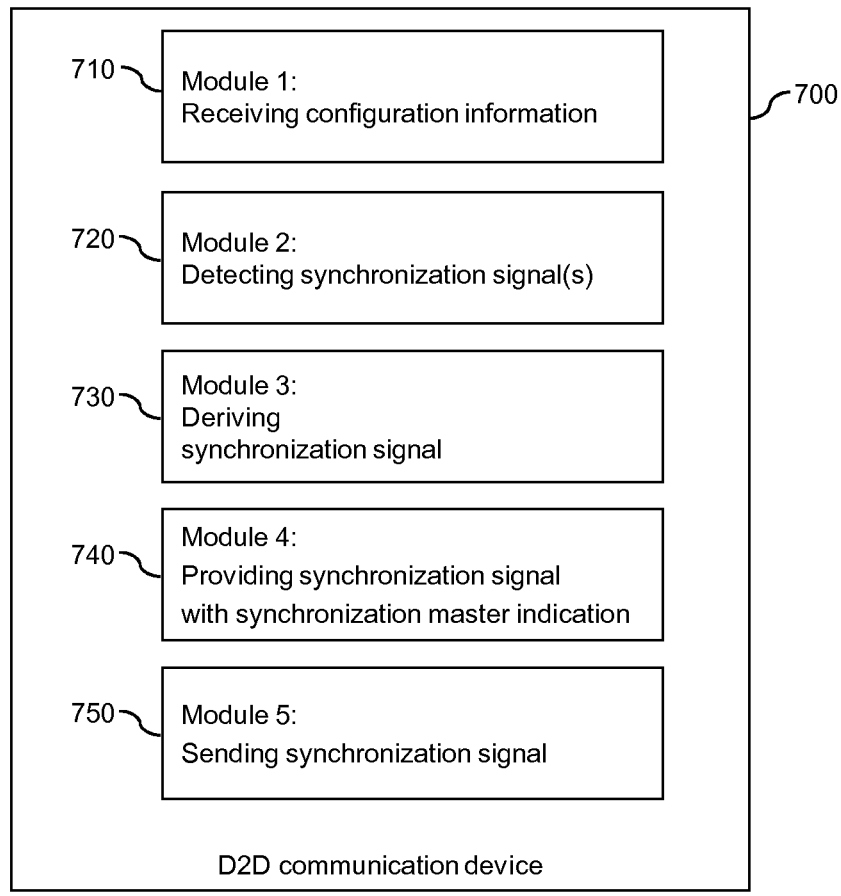
FIG. 7 shows an exemplary block diagram for illustrating functionalities of a D2D communication device implementing functionalities corresponding to the method of FIG. 6.

FIG. 7 shows a block diagram for illustrating functionalities of a D2D communication device 700 which operates according to the method of FIG. 6. The D2D communication device 700 may for example correspond to any of the above-mentioned UEs 10, 11, 12, 13, 14, 15. As illustrated, the D2D communication device 700 may be provided with a module 710 configured to receive configuration information, such as explained in connection with step 610. Further, the D2D communication device 700 device may be provided with a module 720 configured to detect one or more synchronization signals, such as explained in connection with step 620. Further, the D2D communication device 700 may be provided with a module 730 configured to derive a synchronization signal, such as explained in connection with step 630. Further, the D2D communication device 700 may be provided with a module 740 configured to provide the derived synchronization signal with an indication whether the synchronization signal is derived from a synchronization master, such as explained in connection with step 640. Further, the D2D communication device 700 may be provided with a module 750 configured to send the synchronization signal with the indication, such as explained in connection with step 650.

It is noted that the D2D communication device 700 may include further modules for implementing other functionalities, such as known functionalities of a UE in the LTE and/or NR radio technology. Further, it is noted that the modules of the D2D communication device 700 do not necessarily represent a hardware structure of the D2D communication device 700, but may also correspond to functional elements, e.g., implemented by hardware, software, or a combination thereof.

Figure 8:
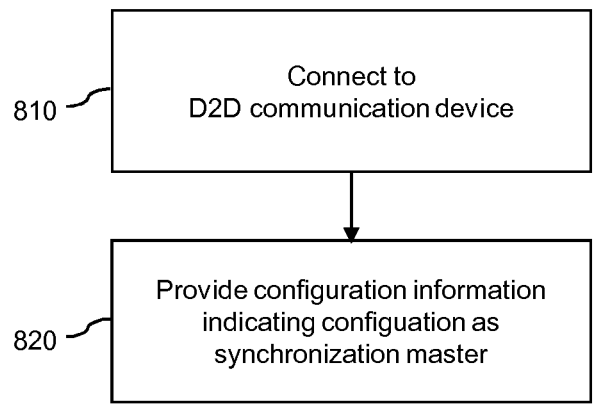
FIG. 8 shows a flowchart for schematically illustrating a further method for configuring a D2D communication device according to an embodiment of the invention.

FIG. 8 shows a flowchart for illustrating a further method, which may be utilized for implementing the illustrated concepts. The method of FIG. 8 may be used for implementing the illustrated concepts in a device used for configuration of a D2D communication devices. Such device may for example correspond to one of the above-mentioned nodes 100, 120, 150, 200. The D2D communication device may correspond to any of the above-mentioned UEs 10, 11, 12, 13, 14, 15. In some scenarios, the D2D device may be a vehicle or vehicle-mounted device, but other types of WD, e.g., as mentioned above, could be used as well.

If a processor-based implementation of the device is used, at least some of the steps of the method of FIG. 8 may be performed and/or controlled by one or more processors of the device. Such device may also include a memory storing program code for implementing at least some of the below described functionalities or steps of the method of FIG. 8.

At optional step 810, a device may connect to the D2D communication device. In some case, the device may be a node of a wireless communication network. Further, the device could connect via a wireless communication network to the D2D communication device. This may be accomplished while the D2D communication device is in coverage of the wireless communication network.

At step 820, configuration information is provided to a D2D communication device, such as one of the above-mentioned UEs 10, 11, 12, 13, 14, 15. The configuration information indicates whether the D2D communication device is configured as a synchronization master. A synchronization master is a D2D communication device which, when not being synchronized to an external synchronization reference, has a higher priority to be used as a synchronization source than other D2D communication devices not synchronized to an external synchronization reference. In some scenarios, step 820 may involve that, while the D2D communication device is in coverage of a wireless communication network, a node of the wireless communication network provides the configuration information to the D2D communication device, e.g., after connecting to the wireless communication network at step 810. However, it is noted that other ways of providing the configuration information could be used as well, e.g., pre-configuration by manufacturer settings, operator settings, or manual settings.

Figure 9:
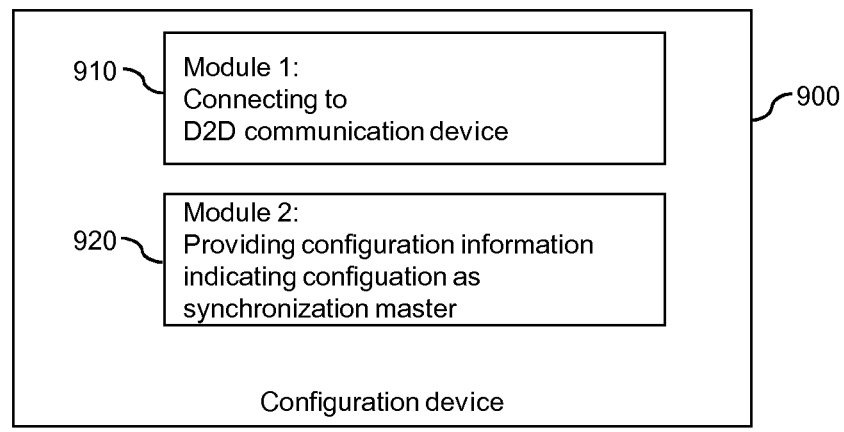
FIG. 9 shows an exemplary block diagram for illustrating functionalities of a configuration device implementing functionalities corresponding to the method of FIG. 6.

FIG. 9 shows a block diagram for illustrating functionalities of a configuration device 900 which operates according to the method of FIG. 8. The configuration device 900 may for example correspond to any of the above-mentioned nodes 100, 120, 150, 200, or to a dedicated management device to be directly coupled to a D2D communication device. As illustrated, the configuration device 900 may be provided with a module 910 configured to connect to a D2D communication device, such as explained in connection with step 810. Further, the configuration device 900 device may be provided with a module 820 configured to provide configuration information to a D2D communication device, such as explained in connection with step 820.

It is noted that the configuration device 900 may include further modules for implementing other functionalities, such as known functionalities of node of a wireless communication network or of a dedicated management device. Further, it is noted that the modules of the configuration device 900 do not necessarily represent a hardware structure of the configuration device 900, but may also correspond to functional elements, e.g., implemented by hardware, software, or a combination thereof.

It is noted that the illustrated concepts could also be implemented in a system including multiple D2D communication devices operating according to the method of FIG. 6. Further, the illustrated concepts could be implemented in a system including one or more D2D communication devices operating according to the method of FIG. 6, and a device operating according to FIG. 8.

Figure 10:
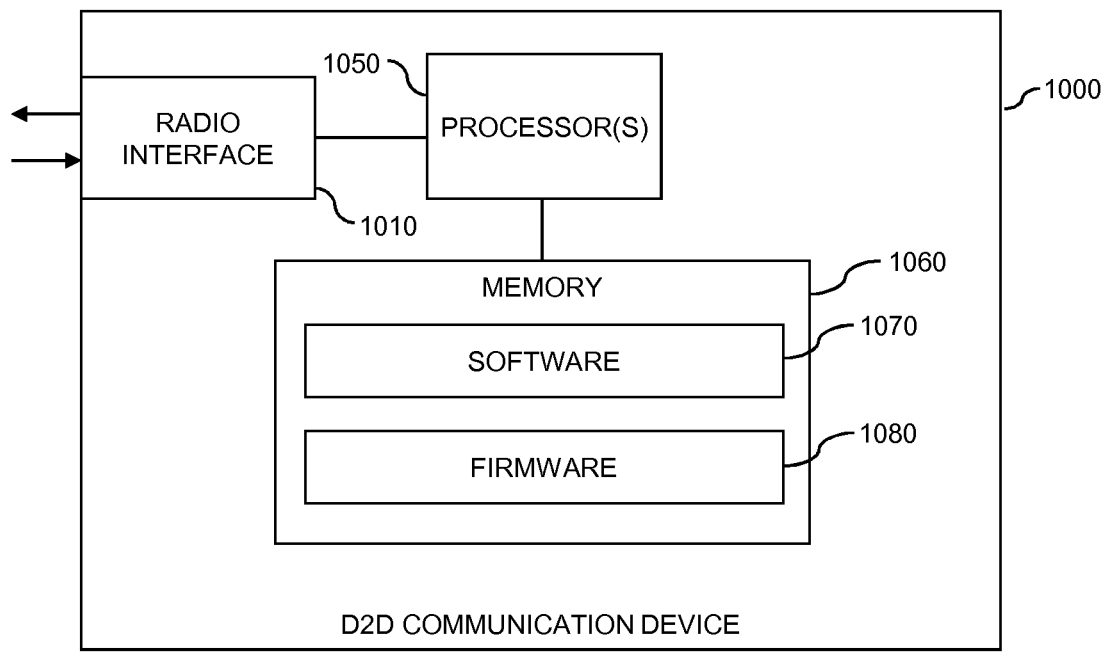
FIG. 10 schematically illustrates structures of a D2D communication device according to an embodiment of the invention.

FIG. 10 illustrates a processor-based implementation of a D2D communication device 1000 which may be used for implementing the above-described concepts. For example, the structures as illustrated in FIG. 10 may be used for implementing the concepts in any of the above-mentioned UEs 10, 11, 12, 13, 14, 15.

As illustrated, the D2D communication device 1000 includes one or more radio interfaces 1010. The radio interface(s) 1010 may for example be based on the LTE technology or the NR technology. The radio interface(s) 1010 may support D2D communication, e.g., using sidelink communication as specified for the LTE technology or the NR technology.

Further, the D2D communication device 1000 may include one or more processors 1050 coupled to the radio interface(s) 1010 and a memory 1060 coupled to the processor(s) 1050. By way of example, the radio interface(s) 1010, the processor(s) 1050, and the memory 1060 could be coupled by one or more internal bus systems of the D2D communication device 1000. The memory 1060 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1060 may include software 1070 and/or firmware 1080. The memory 1060 may include suitably configured program code to be executed by the processor(s) 1050 so as to implement the above-described functionalities for controlling D2D communication, such as explained in connection with FIGS. 6 and 7.

It is to be understood that the structures as illustrated in FIG. 10 are merely schematic and that the D2D communication device 1000 may actually include further components which, for the sake of clarity, have not been illustrated, e.g., further interfaces, such as a dedicated management interface, or further processors. Also, it is to be understood that the memory 1060 may include further program code for implementing known functionalities of a UE. According to some embodiments, also a computer program may be provided for implementing functionalities of the D2D communication device 1000, e.g., in the form of a physical medium storing the program code and/or other data to be stored in the memory 1060 or by making the program code available for download or by streaming.

Figure 11:
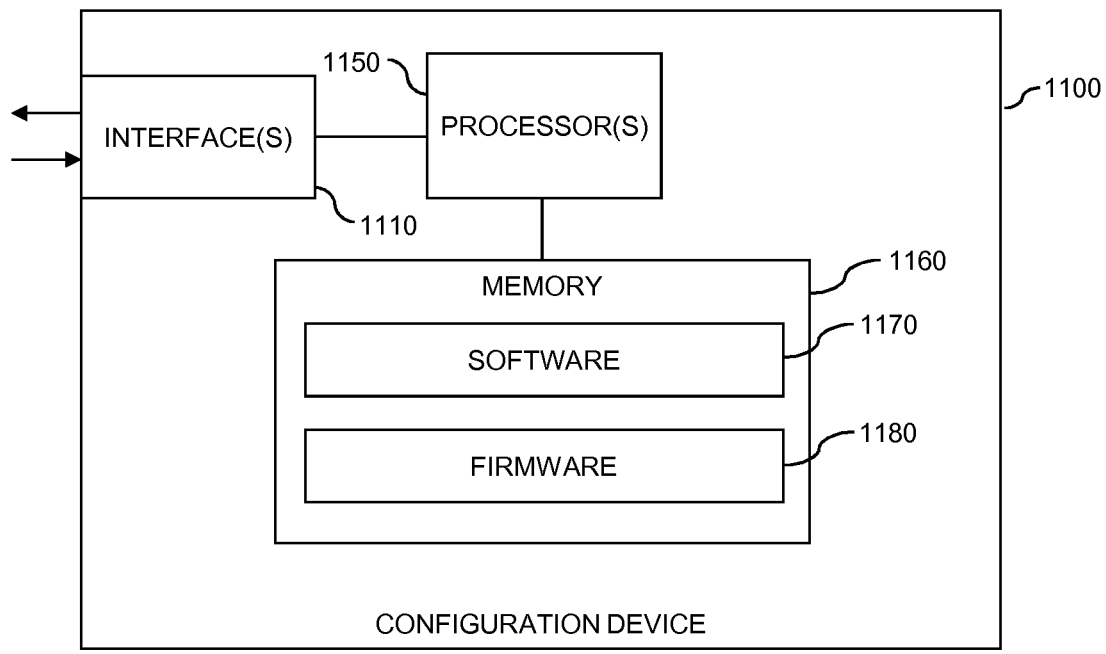
FIG. 11 schematically illustrates structures of a configuration device according to an embodiment of the invention.

FIG. 11 illustrates a processor-based implementation of a configuration device 1100 which may be used for implementing the above-described concepts. For example, the structures as illustrated in FIG. 11 may be used for implementing the concepts in any of the above-mentioned nodes 100, 120, 150, 200 or in a management device be coupled via a configuration link to a D2D communication device, e.g., using a wire-based configuration link. The configuration device 1100 may support configuration of D2D communication devices, such the above-mentioned UEs 10, 11, 12, 13, 14, 15—

As illustrated, the configuration device 1100 includes one or more interfaces 1110. The interface(s) 1110 may include a network interface for connecting via a wireless communication network to a D2D communication device. Further, the interface(s) 1110 may include a wire-based management interface and/or a radio based management interface for directly connecting to a D2D communication device.

Further, the configuration device 1100 may include one or more processors 1150 coupled to the interface(s) 1110 and a memory 1160 coupled to the processor(s) 1150. By way of example, the interface(s) 1110, the processor(s) 1150, and the memory 1160 could be coupled by one or more internal bus systems of the configuration device 1100. The memory 1160 may include a ROM, e.g., a flash ROM, a RAM, e.g., a DRAM or SRAM, a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities for controlling D2D communication, such as explained in connection with FIGS. 8 and 9.

It is to be understood that the structures as illustrated in FIG. 11 are merely schematic and that the configuration device 1100 may actually include further components which, for the sake of clarity, have not been illustrated, e.g., further interfaces or processors. Also, it is to be understood that the memory 1160 may include further program code for implementing known functionalities of a network node or of a dedicated management device. According to some embodiments, also a computer program may be provided for implementing functionalities of the configuration device 1100, e.g., in the form of a physical medium storing the program code and/or other data to be stored in the memory 1160 or by making the program code available for download or by streaming.

As can be seen, the concepts as described above may be used for efficiently controlling synchronization procedures in D2D communication, in particular with respect to utilization of a D2D communication device as synchronization source. More specifically, the illustrated concepts may be used for efficiently achieving convergent selection of a common synchronization source by multiple D2D communication devices to which synchronization from an access node of a wireless communication network or from a GNSS is not available. Further, the illustrated concepts may be used for quickly and efficiently distributing synchronization information among such D2D communication device.

It is to be understood that the examples and embodiments as explained above are merely illustrative and susceptible to various modifications. For example, the illustrated concepts may be applied in connection with various kinds of radio technologies, without limitation to the LTE technology or NR technology. Further, the concepts may be applied with respect to various types of UEs, without limitation to vehicle-based UEs. Further, the concepts may be applied in connection with various services supported by D2D communication, without limitation to V2X or NSPS services. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling device-to-device, D2D, communication, the method comprising:
   a D2D communication device sending a synchronization signal to enable synchronization of one or more other D2D communication devices, the D2D communication device sending the synchronization signal at a first repetition rate which is different from a second repetition rate applied by the one or more other D2D communication devices for sending another synchronization signal; and
   the D2D communication device providing the synchronization signal with an indication indicating that the synchronization signal is derived from the D2D communication device configured as a synchronization master which, when not being synchronized to an external synchronization reference, has a higher priority to be used as a synchronization source than other D2D communication devices not synchronized to the external synchronization reference.

2. The method according to claim 1, wherein the first repetition rate is an integer multiple of the second repetition rate.

3. The method according to claim 1, comprising:
   in response to being configured as the synchronization master and not being synchronized to the external synchronization reference, the D2D communication device deriving the synchronization signal from an internal clock of the D2D communication device.

4. The method according to claim 3, comprising:
   the D2D communication device detecting synchronization signals from other D2D communication devices; and
   in response to none of the detected synchronization signals comprising another indication indicating that the synchronization signal is derived from another D2D communication device configured as another synchronization master, the D2D communication device deriving the synchronization signal from the internal clock of the D2D communication device and providing the synchronization signal with the indication indicating that the synchronization signal is derived from the D2D communication device configured as the synchronization master.

5. The method according to claim 1, comprising:
   the D2D communication device detecting synchronization signals from other D2D communication devices; and
   in response to one of the detected synchronization signals comprising another indication indicating that the synchronization signal is derived from another D2D communication device configured as another synchronization master, the D2D communication device deriving the synchronization signal from this detected synchronization signal.

6. The method according to claim 5, comprising:
   the D2D communication device sending the synchronization signal at synchronization occasions defined by a repetition rate; and
   in response to initially detecting the synchronization signal comprising the other indication indicating that the synchronization signal is derived from the other D2D communication device configured as the other synchronization master, the D2D communication device sending the synchronization signal before a next synchronization occasion of the synchronization occasions.

7. The method according to claim 6, comprising:
the D2D communication device sending the synchronization signal in a reserved radio resource before the next synchronization occasion.

8. The method according to claim 6, comprising:
the D2D communication device performing a sensing procedure to detect a radio resource which is available before the next synchronization occasion, wherein the D2D communication device sends the synchronization signal in the detected available radio resource.

9. The method according to claim 8, wherein the sensing procedure comprises detecting sidelink control information transmitted by one or more other D2D communication devices and determining the radio resource based on the detected sidelink control information.

10. The method according to claim 5, wherein the detected synchronization signal indicates a number of hops involved in deriving the detected synchronization signal from the synchronization source; and
wherein the sending of the synchronization signal before a next synchronization occasion is performed in response to the number of hops being below a threshold.

11. The method according to claim 5, comprising:
the D2D communication device detecting two or more synchronization signals comprising the other indication indicating that the synchronization signal is derived from the other D2D communication device configured as the other synchronization master, the detected two or more synchronization signals each indicating a number of hops involved in deriving the detected synchronization signal from the other synchronization source;
based on the indicated numbers of hops, the D2D communication device selecting one of the two or more synchronization signals; and
the D2D communication device deriving the synchronization signal from the selected synchronization signal.

12. The method according to claim 5, comprising:
the D2D communication device detecting two or more synchronization signals comprising the other indication indicating that the synchronization signal is derived from the other D2D communication device configured as the other synchronization master;
based on signal strengths of the two or more synchronization signals, the D2D communication device selecting one of the two or more synchronization signals; and
the D2D communication device deriving the synchronization signal from the selected synchronization signal.

13. The method according to claim 1, wherein the sent synchronization signal indicates a number of hops involved in deriving the synchronization signal from the synchronization source.

14. The method according to claim 1, comprising:
the D2D communication device receiving configuration information, the configuration information indicating whether the D2D communication device is configured as the synchronization master.

15. The method according to claim 1, wherein the D2D communication device is a vehicle or a vehicle-mounted device.

16. A method implemented in a configuration device for configuring a D2D communication device, the method comprising:
providing configuration information to the D2D communication device, the configuration information configuring the D2D communication device to send a synchronization signal to enable synchronization of one or more other D2D communication devices and provide the synchronization signal with an indication, the D2D communication device sending the synchronization signal at a first repetition rate which is different from a second repetition rate applied by the one or more other D2D communication devices for sending another synchronization signal, the indication indicating that the synchronization signal is derived from the D2D communication device configured as a synchronization master which, when not being synchronized to an external synchronization reference, has a higher priority to be used as a synchronization source than other D2D communication devices not synchronized to the external synchronization reference.

17. The method according to claim 16, the method comprising:
while the D2D communication device is in coverage of a wireless communication network, a node of the wireless communication network providing the configuration information to the D2D communication device.

18. A D2D communication device, the D2D communication device comprising:
at least one processor; and
a memory containing program code executable by the at least one processor, execution of the program code by the at least one processor causing the D2D communication device to:
send a synchronization signal to enable synchronization of one or more other D2D communication devices, the D2D communication device sending the synchronization signal at a first repetition rate which is different from a second repetition rate applied by the one or more other D2D communication devices for sending another synchronization signal; and
provide the synchronization signal with an indication indicating that the synchronization signal is derived from the D2D communication device configured as a synchronization master which, when not being synchronized to an external synchronization reference, has a higher priority to be used as a synchronization source than other D2D communication devices not synchronized to the external synchronization reference.

19. A configuration device for configuration of a D2D communication device, the configuration device comprising:
at least one processor; and
a memory containing program code executable by the at least one processor, execution of the program code by the at least one processor causing the configuration device to:
provide configuration information to the D2D communication device, the configuration information configuring the D2D communication device to send a synchronization signal to enable synchronization of one or more other D2D communication devices and provide the synchronization signal with an indication, the D2D communication device sending the synchronization signal at a first repetition rate which is different from a second repetition rate applied by the one or more other D2D communication devices for sending another synchronization signal, the indication indicating that the synchronization signal is derived from the D2D communication device configured as a synchronization master which, when not being synchronized to an external synchronization reference, has a higher priority to be used as a synchronization source than other D2D communication devices not synchronized to the external synchronization reference.

* * * * *